(12) United States Patent
Dautel et al.

(10) Patent No.: US 10,478,927 B2
(45) Date of Patent: Nov. 19, 2019

(54) DEVICE FOR ASSEMBLING CAMS ON A CAMSHAFT PIPE

(71) Applicant: Mahle International GmbH, Stuttgart (DE)

(72) Inventors: Frank Dautel, Gerlingen (DE); Thomas Flender, Eberdingen (DE); Antonio Menonna, Ditzingen (DE); Stefan Steichele, Gerlingen (DE)

(73) Assignee: Mahle International GmbH (DE)

( * ) Notice: Subject to any disclaimer, the term of this patent is extended or adjusted under 35 U.S.C. 154(b) by 806 days.

(21) Appl. No.: 14/910,680

(22) PCT Filed: Jun. 27, 2014

(86) PCT No.: PCT/EP2014/063673
§ 371 (c)(1),
(2) Date: May 24, 2016

(87) PCT Pub. No.: WO2015/018563
PCT Pub. Date: Feb. 12, 2015

(65) Prior Publication Data
US 2016/0271742 A1    Sep. 22, 2016

(30) Foreign Application Priority Data

Aug. 8, 2013 (DE) .................. 10 2013 215 711

(51) Int. Cl.
*F01L 1/047* (2006.01)
*B23P 11/02* (2006.01)
*F16H 53/02* (2006.01)

(52) U.S. Cl.
CPC ............. *B23P 11/025* (2013.01); *F01L 1/047* (2013.01); *F16H 53/025* (2013.01); *B23P 2700/02* (2013.01); *F01L 2001/0471* (2013.01); *F01L 2103/01* (2013.01)

(58) Field of Classification Search
CPC .. B23P 11/025; B23P 2700/02; F16H 53/025; F01L 1/047; F01L 2103/01; F01L 2001/0471
See application file for complete search history.

(56) References Cited

U.S. PATENT DOCUMENTS 6,347,451 B1    2/2002  Bloecker et al.

FOREIGN PATENT DOCUMENTS

| DE | 102004049272 A1 | 4/2006 |
| DE | 102004060807 B3 | 6/2006 |
| DE | 102008064194 A1 | 7/2010 |

(Continued)

OTHER PUBLICATIONS

English abstract for DE102004060807B3.
(Continued)

*Primary Examiner* — John C Hong
(74) *Attorney, Agent, or Firm* — Fishman Stewart PLLC

(57) ABSTRACT

A device for assembling cams on a camshaft pipe of a camshaft may include a first gripper and a second gripper each configured for gripping and holding a respective cam. The first gripper and the second gripper may receive the respective cam in a common direction and may be movable in a common direction into alignment with respect to the camshaft pipe. The second gripper may be configured to grip and hold the respective cam that is pivoted by 90° with respect to an orientation of the respective cam in the first gripper.

20 Claims, 3 Drawing Sheets

(56) References Cited

FOREIGN PATENT DOCUMENTS

| | | |
|---|---|---|
| DE | 102009060349 A1 | 6/2011 |
| DE | 102010055123 A1 | 6/2012 |
| EP | 931604 A1 | 7/1999 |
| JP | S51-54115 A | 5/1976 |
| JP | S6297722 A | 5/1987 |
| JP | 2000-073709 A | 3/2000 |
| WO | WO-2013048166 A2 | 4/2013 |

OTHER PUBLICATIONS

English abstract for DE102010055123A1.
English abstract for DE102009060349A1.
English abstract for DE102004049272A1.

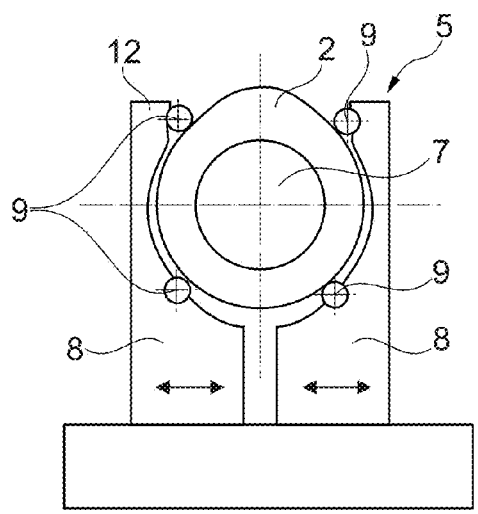
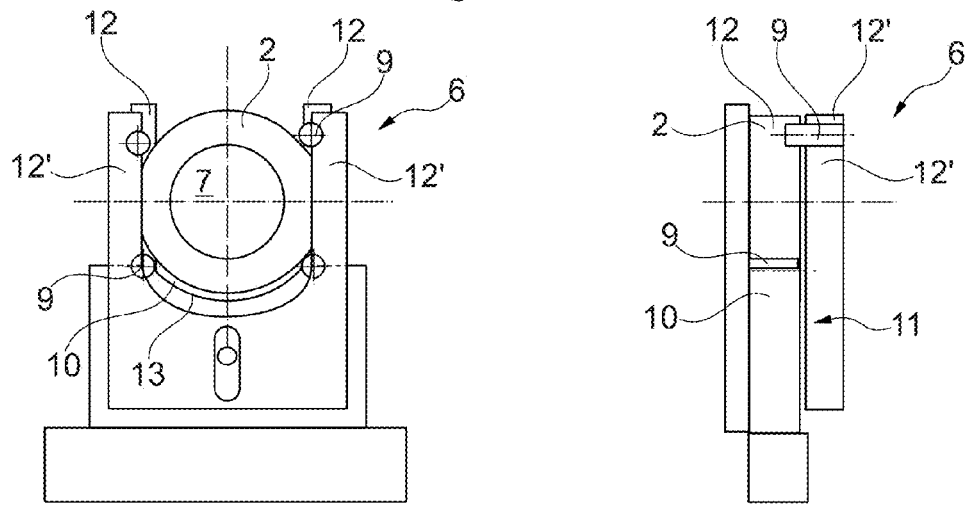
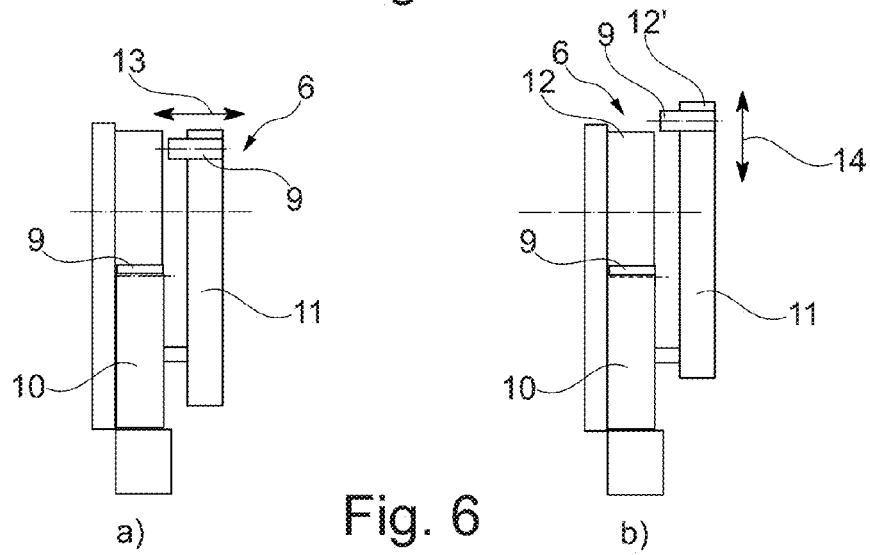

DEVICE FOR ASSEMBLING CAMS ON A CAMSHAFT PIPE

CROSS-REFERENCE TO RELATED APPLICATIONS

This application claims priority to German Patent Application No. 10 2013 215 711.8, filed Aug. 8, 2013, and International Patent Application No. PCT/EP2014/063673, filed Jun. 27, 2014, both of which are hereby incorporated by reference in their entirety.

TECHNICAL FIELD

The present invention relates to a pipe for assembling cams on a camshaft pipe of a camshaft with at least one first gripper and a second gripper for gripping and holding the cams during the assembly process. The invention, furthermore, relates to a method for thermally joining cams on a camshaft pipe using such a device and to a second gripper for such a device.

BACKGROUND

Generic devices are thoroughly known and have been industrially employed for a long time for the automated production of camshafts. Disadvantageous with the known devices however is that because of the grippers, all cams have to be gripped in the same manner and by pivoting the camshaft pipe have to be fixed on the same in appropriate angular position. Because of this, merely a sequential joining of the cams on the camshaft pipe is usually possible.

SUMMARY

The present invention therefore deals with the problem of stating an improved embodiment for a device of the generic type, which is characterized in particular by a rationalised mode of operation.

According to the invention, this problem is solved through the subjects of the independent claims. Advantageous embodiments are subject of the dependent claims.

The present invention is based on the general idea of providing two different grippers with a device for the assembly of cams on a camshaft or a camshaft pipe known per se, for gripping and holding the cams during the assembly process, wherein these two grippers can be fitted with cams from the same direction and can be moved in the same direction into alignment with the camshaft tube, and wherein the second gripper makes possible gripping a cam that is pivoted by 90° with respect to the first gripper. Because of this it is possible for the first time to replace the previously customary sequential assembly of the cams by a single operation, with which advantageously all, however, at least two cams, are ideally prepositioned with respect to their alignment and with respect to their correct angular orientation. With previous grippers, which usually comprised two jaws that can be moved relative to one another, reliable gripping of the cam is only possible in particular when the same can be gripped on its longitudinal sides. With the sequential assembly of the cams, pivoting of the camshaft tube is required in order to assemble the cams on the camshaft pipe in their correct angular position. With the grippers usual up to now, gripping of the cams pivoted by 90° is not possible and the previous grippers would have to be arranged on the device offset by 90°, which however is not desired for space reasons. Ideally, one would like to arrange all grippers in an alignment, since grippers that are arranged offset require lots of installation space. With the device according to the invention it is additionally possible to make possible cams also with respect to a bearing frame or in a cover module, with which in a case of doubt accessibility is possible from one side only. With the device according to the invention it is thus possible for the first time to bring about the assembly of cams on a camshaft pipe angularly offset through different grippers, wherein the at least two different grippers can be fitted with cams from the same direction. Through the same fitting direction and the same movability, joining of a camshaft in a cover module or a bearing frame is thus also possible, with which accessibility is exclusively possible from one side.

With a further advantageous embodiment of the solution according to the invention, a first gripper comprises two jaws that are moveable against one another, which clamp the cam to be gripped between them. These two jaws are moved apart for receiving and for fixing the cam subject to clamping the same in-between, are clamped against one another. Usually, contact bodies are arranged on the two jaws which bring about a comparatively small heat-transferring contact area with the gripped cam, so that the cam that is heated for the thermal joining is not subjected to an undesirably high heat outflow via the first gripper.

Practically, a second gripper of the device comprises a U-shaped seat and a likewise U-shaped holder that can be axially and radially moved relative to the former. Here, two contact bodies are arranged on the U-shaped seat on which the cam to be held is supported. In addition to this, the U-shaped holder and the U-shaped seat are orientated identically, wherein in the region of the free ends of the two U-legs of the U-shaped holder, contact bodies are likewise provided, which however protrude over the holder in the direction of the U-shaped seat and thus, with the holder adjusted axially with respect to the U-shaped seat, make possible inserting the cam and when moving the holder together onto the seat, make possible fixing the cam in the second gripper. The second gripper, fixing the cam to be joined is thus possible with horizontal cam peak, wherein with the first gripper, upright gripping and fixing of the cam with the cam peak orientated upwards or downwards is possible.

The invention, furthermore, is based on the general idea of using the device for the thermal joining of cams on a camshaft pipe described above, wherein for this purpose initially at least two adjacent cams are heated. Following this, one of the two cams is placed in the first gripper and the other gripper pivoted by 90° placed in the second gripper. The two grippers in this case can already be orientated aligned with the camshaft pipe or be moved into alignment with the same. Following this, the camshaft pipe is pushed through the two cams until the two cams, through a temperature equalisation, after a waiting period, are shrunk onto the camshaft pipe and thereby fixed. With the device according to the invention it is thus possible to assemble two cams in parallel, as a result of which rationalisation of the assembly process can be achieved. If the two grippers are not orientated aligned with the camshaft pipe anyway, these can be orientated aligned with the camshaft pipe prior to moving the same, for example moved against a stop.

The present invention is based, furthermore, on the general idea of providing such a second gripper with a U-shaped seat and a holder that is likewise designed U-shaped that can be axially and radially moved with respect to the former, in order to purely theoretically also retrofit conventional devices in terms of the invention by means of such a second gripper. With such a second gripper and at least one first gripper that is already originally provided, a particularly space-saving and installation space-optimised device can be achieved which is suitable in particular also for the assembly of camshaft in cover modules or bearing frames.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

DETAILED DESCRIPTION

Figure 1:
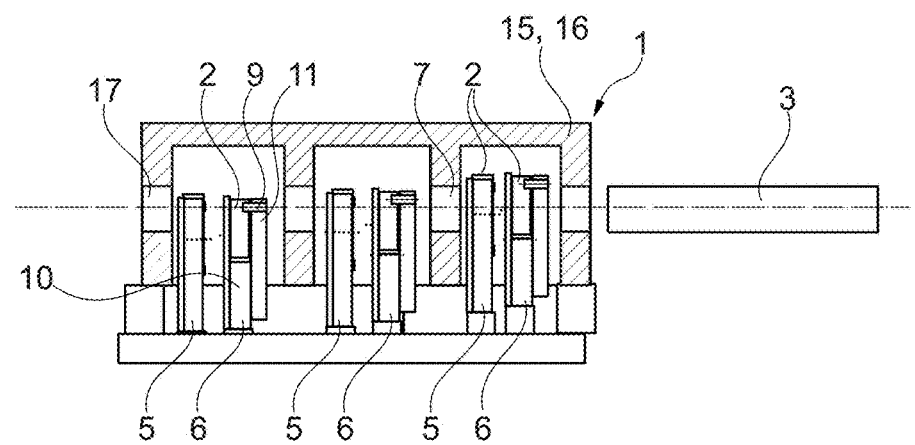
FIG. 1 a device according to the invention for the assembly of cams in a camshaft pipe of a camshaft during the installation of the camshaft in a bearing frame or a cylinder head cover, FIG. 2 a representation as in FIG. 1, however with a later method step, FIG. 3 the device according to the invention during the assembly of cams on a camshaft pipe of the camshaft, FIG. 4 a representation of a possible embodiment of a first gripper of the device according to the invention, FIG. 5 two perspective views of a second gripper of the device, FIGS. 6a, 6b lateral views of the second gripper with different moved U-shaped holder, FIGS. 7a, 7b lateral views of the second gripper as in FIGS. 6a, 6b, however with obliquely moveable holder.
Figure 2:
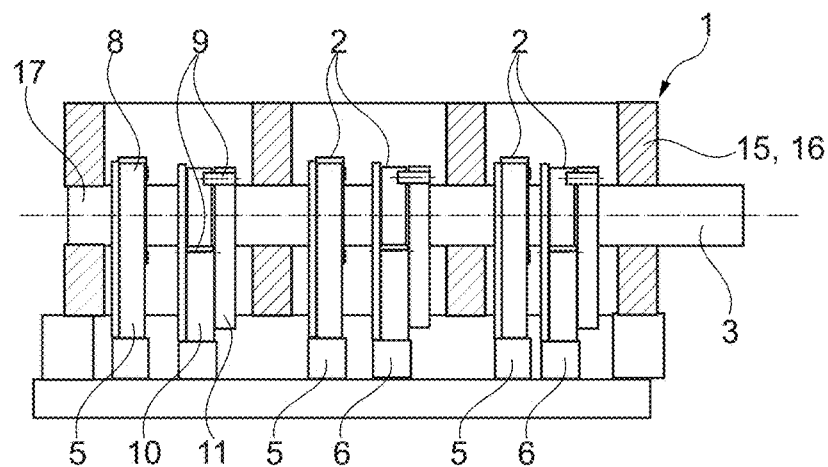
Figure 3:
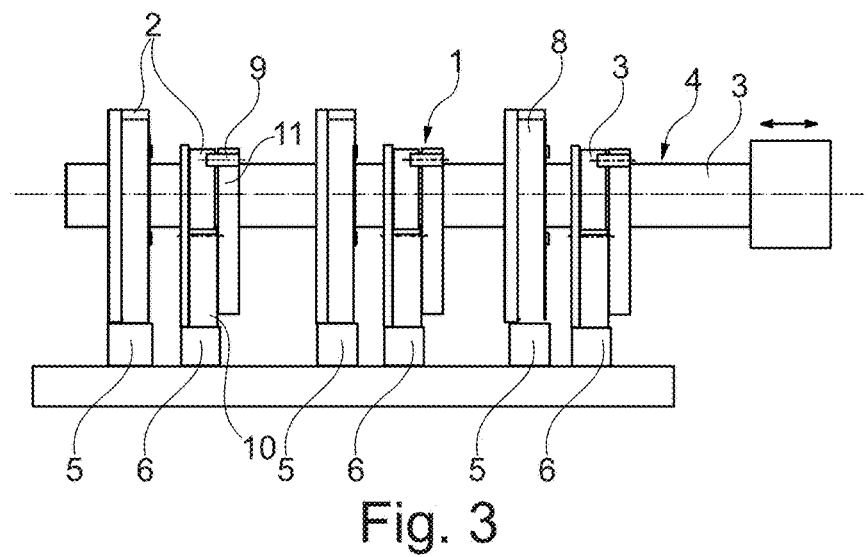

According to FIGS. 1 to 3, a device 1 according to the invention for assembling cams 2 on a camshaft pipe 3 of a camshaft 4 comprises at least one first gripper 5 and a second gripper 6 for gripping and holding the cams 2 during the assembly process. The devices 1 according to FIGS. 1 to 3 in this case each comprise three first grippers 5 and three second grippers 6. All grippers 5, 6 in this case can be fitted with cams 2 from the same direction, according to FIGS. 1 to 3 from above and moved in the same direction into alignment with the camshaft pipe 3. In the shown case, the individual grippers 5, 6 can be vertically adjusted in such a manner that the cams 2 which are fixed in the grippers 5, 6 are orientated with their cam bore 7 aligned with the camshaft pipe 3. According to the invention, the second gripper 6 is now able to hold a cam 2 pivoted by 90° with respect to the cam 2 held in the first gripper 5. Because of this, not only a particularly installation space-optimised design of the device 1 but also a comparatively quick assembling of the cams 2 on the camshaft pipe 3 is possible.

Considering the first gripper 5, as is shown according to FIG. 4, two jaws 8 that can be moved against one another are noticeable on the same, which clamp the cam 2 to be gripped in-between them. On each of the jaws 8, two contact bodies 9 are arranged here, which during the gripping of the cam 2 establish merely a minor mechanical contact with the same, thereby minimising a possible heat transfer. Minimising the heat transfer is required in particular in order to avoid that the cams 2 which are heated for the thermal joining do not cool down too quickly in the gripper 5, 6.

Considering, by contrast, the second gripper 6, as it is shown according to FIGS. 5 and 6, it is evident that the same has a U-shaped seat 10 and likewise a U-shaped holder 11 that can be axially and radially moved with respect to the former. Here, two contact bodies 9 are arranged on the U-shaped seat 10 and two further contact bodies on the U-shaped holder 11. The U-shaped holder 11 and the U-shaped seat 10 in this case are orientated identically, in the present case with a U that is open towards the top, as a result of which fitting the second gripper 6 with a cam 2 is possible from the top. The contact bodies 9 of the U-shaped seat 10 in this case are arranged in a transition between the U-shaped legs 12 and a base 13. The contact bodies 9 on the U-shaped holder 11 in this case are arranged in the region of the free ends of the U-legs 12' of the U-shaped holder 11 and protrude over the holder 11 in the direction of the U-shaped seat 10. Generally, the contact bodies 9 can be designed cylindrical, in particular as roller bodies, wherein attention has to be paid at all times to a comparatively small contact area and thus a low heat transfer to the cam 2. During the assembly of the cam 2 on the camshaft pipe 3, said cam is clamped in-between the four contact bodies 9 of the second gripper 6.

Considering FIG. 6a, it is evident by the same, that the U-shaped holder 11 can be moved in axial direction 13 relative to the U-shaped seat 10, likewise as in radial direction 14, as is shown according to FIG. 6b. Through the axial and radial movability of the holder 11, inserting the cam 2 in the seat 10 is possible without problems as is shown according to FIG. 6a. For fixing the cam 2 in the second gripper 6, the holder 11 is subsequently moved up against the U-shaped seat 10, as a result of which the contact bodies 9 which are arranged on the U-legs 12' of the holder 11 are moved over the cam 2 to be gripped. Following this, the holder 11 can be still moved slightly downwards in radial direction, as a result of which fixing the cam 2 between the now total of four contact bodies 9 is enforced.

Figure 7A:
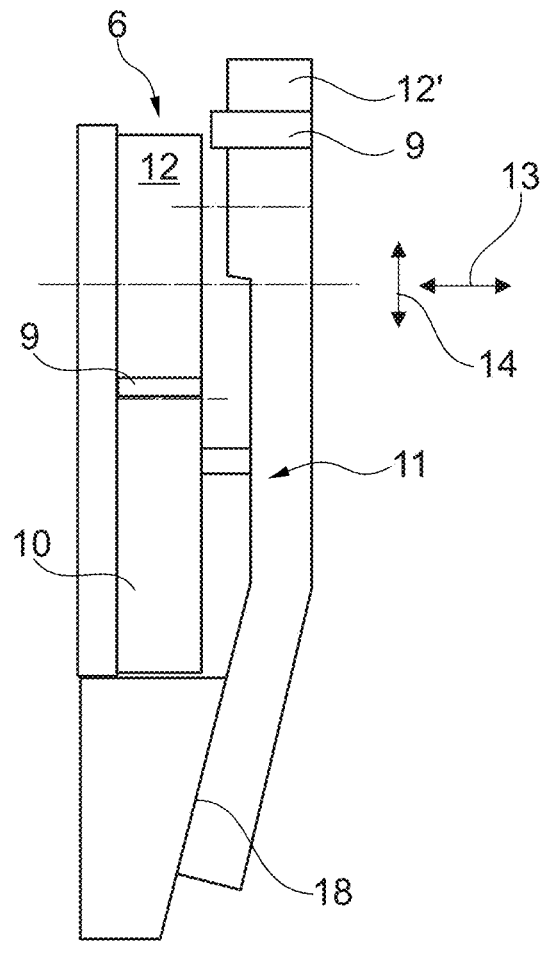
Figure 7B:
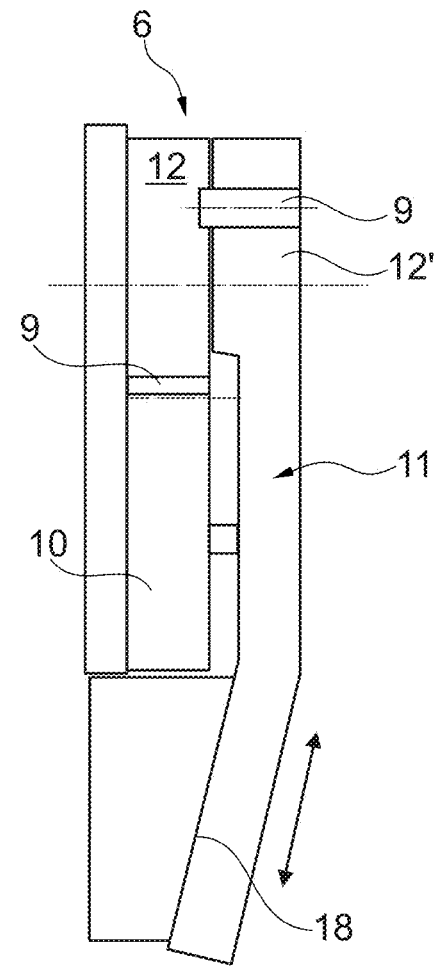

Considering FIG. 7a, b it is evident from the same that on the U-shaped seat 10 an inclined plane 18 is arranged, via which the U-shaped holder 11 is adjustable obliquely with respect to the U-shaped seat 10, i.e. obliquely with respect to the axial direction 13 and obliquely with respect to the radial direction 14. Through the oblique movability of the holder 11, a simultaneous movement of the holder 11 both in axial direction 13 and also in radial direction 14 can be achieved until the cam 2 is clamped in.

The second gripper 6 according to the invention in this case offers the major advantage that in contrast with the first gripper 5, it makes possible gripping the cam 2 in the horizontal state, i.e. for example with a cam assembly lying in one horizon, which is not possible with the first gripper 5, since the same allows reliable gripping of the cam 2 merely on the longitudinal sides of the same. With a device 1 with exclusively first grippers 5, these would have to be arranged pivoted 90° relative to one another, as a result of which the device 1 requires a considerably greater installation space. Otherwise, special grippers would have to be used which make possible pivoting the cam 2 for the assembly, which however in terms of design is comparatively elaborate and consequently expensive. Through the combination of the first and second grippers 5, 6 according to the invention, these can be arranged on the same side of the device 1, which in particular makes possible also assembling a camshaft 4 in a bearing frame 15 or a cylinder head cover 16, in the case of which accessibility is exclusively possible from one side.

Generally, the cams 2 can be assembled on the camshaft pipe 3 using the device 1 according to the invention as follows. Initially, at least two adjacent cams 2 are heated, wherein one of the two cams 2 is placed into the first gripper 5 and the other cam 2 pivoted by 90° into the second gripper 6. Following this, the two grippers 5, 6 are moved into alignment with the camshaft pipe 3 so that the same can be pushed through the cam bores 7 of the cams 2. This is followed by a waiting period until the two cams 2 are shrunk onto the camshaft pipe 3 through temperature equalisation and because of this fixed thereon.

Here it is possible that the two grippers 5, 6 are moved into the assembly position only just before the reaching of the joining position of the camshaft pipe 3 so that generally more than two non-assembled cams 2 are never in alignment with the camshaft pipe 3. If the camshaft 4 is to be assembled in a bearing frame 15 or a cylinder head cover 16, the same can be initially positioned in such a manner that their openings 17 are aligned with the camshaft pipe 3. Obviously, the camshaft pipe 3 would not have to be pushed in horizontally as shown in FIGS. 1 to 3, but can obviously be pushed in also vertically with corresponding orientation of the device.

The invention claimed is:

1. A device for assembling cams on a camshaft pipe of a camshaft, comprising:
   a first gripper and a second gripper each configured for gripping and holding a respective cam during assembly, wherein the first gripper and the second gripper receive the respective cam in a common direction and are movable in a common direction into alignment with respect to the camshaft pipe, and the second gripper grips and holds the respective cam that is pivoted by 90° with respect to an orientation of the respective cam in the first gripper; and
   wherein the second gripper comprises a U-shaped seat and a U-shaped holder, and the U-shaped holder is movable axially and radially with respect to the U-shaped seat.

2. The device according to claim 1, wherein the first gripper comprises two jaws that are movable against one another, and wherein the first gripper clamps the respective cam to be gripped between said two jaws.

3. The device according to claim 1, further comprising at least two contact bodies arranged on the U-shaped seat that mount the respective cam to be held.

4. The device according to claim 3, wherein the at least two contact bodies have a cylindrical shape.

5. The device according to claim 1, wherein the U-shaped holder and the U-shaped seat have a corresponding orientation, wherein the U-shaped holder has U-legs and includes contact bodies arranged at a free end of the U-legs, and wherein the contact bodies protrude over the U-shaped holder in a direction of the U-shaped seat.

6. The device according to claim 5, wherein the contact bodies are roller bodies.

7. The device according to claim 1, further comprising at least two contact bodies arranged on each of the U-shaped seat and the U-shaped holder, wherein the respective cam is clamped in-between the at least two contact bodies of the U-shaped seat and the U-shaped holder.

8. The device according to claim 5, wherein the U-shaped holder and the U-shaped seat are aligned axially and radially with respect to a longitudinal axis of the camshaft.

9. The device according to claim 1, wherein the U-shaped holder is adjustable obliquely with respect to the U-shaped seat.

10. The device according to claim 9, wherein the U-shaped seat defines an inclined surface plane, and wherein the U-shaped holder is adjustable obliquely via the inclined surface plane with respect to the U-shaped seat.

11. A method for joining cams on a camshaft pipe via an assembly device, comprising:
    providing a first gripper and a second gripper configured to mount at least two cams, the second gripper comprising a U-shaped seat and a U-shaped holder, wherein the U-shaped holder is movable axially and radially with respect to the U-shaped seat;
    heating the at least two cams;
    positioning a first of the at least two cams in the first gripper and a second of the at least two cams into the second gripper that is pivoted by 90° with respect to the first cam;
    moving the first gripper and the second gripper into alignment with the camshaft pipe;
    pushing the camshaft pipe through the at least two cams mounted in the first gripper and the second gripper; and
    performing a temperature equalisation for a predetermined waiting period until the at least two cams shrink-fit onto the camshaft pipe to define a fixed connection.

12. The method according to claim 11, wherein the first cam and the second cam are positioned in the first gripper and the second gripper, respectively, from a common direction, and wherein the first gripper and the second gripper are moved in a common direction into alignment with the camshaft pipe.

13. A gripper of an assembly device for mounting a cam on a camshaft, comprising: a U-shaped seat and a U-shaped holder, wherein the U-shaped seat and the U-shaped holder are movable axially and radially relative to one another with respect to a longitudinal axis of the camshaft.

14. The gripper according to claim 13, further comprising at least two contact bodies disposed on the U-shaped seat, wherein the at least two contact bodies support the cam to be held in the U-shaped seat.

15. The gripper according to claim 14, wherein the U-shaped seat and the U-shaped holder are aligned axially and radially with respect to the longitudinal axis.

16. The gripper according to claim 15, wherein the U-shaped holder has U-legs and includes contact bodies arranged at a free end of the U-legs, and wherein the contact bodies protrude over the U-shaped holder in a direction of the U-shaped seat.

17. The gripper according to claim 13, wherein the U-shaped seat and the U-shaped holder are aligned axially and radially with respect to the longitudinal axis.

18. The gripper according to claim 17, wherein the U-shaped holder has U-legs and includes contact bodies arranged at a free end of the U-legs, and wherein the contact bodies protrude over the U-shaped holder in a direction of the U-shaped seat.

19. The gripper according to claim 13, wherein the U-shaped holder is adjustable obliquely with respect to the U-shaped seat.

20. The gripper according to claim 19, wherein the U-shaped seat defines an inclined surface plane, and wherein the U-shaped holder is adjustable obliquely via the inclined surface plane with respect to the U-shaped seat.

* * * * *